(12) United States Patent
Marchand et al.

(10) Patent No.: US 8,968,696 B2
(45) Date of Patent: Mar. 3, 2015

(54) FERTILIZER FOR FOLIAR USE

(71) Applicant: Tessenderlo Chemie NV, Brussels (BE)

(72) Inventors: Michel Marchand, Brussels (BE); Nicolas White, Brussels (BE); Peter Landuyt, Brussels (BE); Peter Luts, Brussels (BE)

(73) Assignee: Tessenderlo Chemie N.V., Brussels (BE)

( * ) Notice: Subject to any disclaimer, the term of this patent is extended or adjusted under 35 U.S.C. 154(b) by 0 days.

(21) Appl. No.: 14/151,893

(22) Filed: Jan. 10, 2014

(65) Prior Publication Data

US 2014/0190227 A1    Jul. 10, 2014

Related U.S. Application Data

(60) Provisional application No. 61/751,016, filed on Jan. 10, 2013.

(51) Int. Cl.
| | | |
|---|---|---|
| *C01D 5/00* | (2006.01) | |
| *C05D 1/00* | (2006.01) | |
| *C09K 17/00* | (2006.01) | |
| *C05G 3/00* | (2006.01) | |
| *C05D 1/02* | (2006.01) | |

(52) U.S. Cl.
CPC .. C05D 1/00 (2013.01); C01D 5/00 (2013.01); C05D 1/005 (2013.01); C05G 3/007 (2013.01); C05D 1/02 (2013.01)
USPC ............... 423/551; 71/63; 71/64.13; 47/48.5; 47/58.1 SC (58) Field of Classification Search
USPC ....... 423/551; 71/63, 64.13; 47/48.5, 58.1 SC
See application file for complete search history.

(56) References Cited

U.S. PATENT DOCUMENTS

| 1,446,185 | A | * | 2/1923 | Horst ............................ 423/551 |
| 3,395,980 | A | * | 8/1968 | Dancy ........................... 423/197 |
| 3,519,413 | A | | 7/1970 | Trimbach et al. |
| 3,687,639 | A | | 8/1972 | Barlow et al. |
| 3,853,490 | A | | 12/1974 | Boeglin et al. |
| 4,491,464 | A | | 1/1985 | Ashmead et al. |
| 5,298,050 | A | | 3/1994 | McLaughlin et al. |
| 6,365,122 | B1 | | 4/2002 | Rigby et al. |
| 2004/0035162 | A1 | | 2/2004 | Williams et al. |
| 2005/0119124 | A1 | | 6/2005 | Alyeshmerni |
| 2012/0255335 | A1 | | 10/2012 | Fairweather et al. |

FOREIGN PATENT DOCUMENTS

| JP | H11 302141 A | 11/1999 |
| JP | 2008 013656 A | 1/2008 |
| WO | 95/28369 A1 | 10/1995 |
| WO | 99/54028 A1 | 10/1999 |
| WO | 2005/028400 A1 | 3/2005 |

OTHER PUBLICATIONS

Dutch Search Report and Written Opinion (international type) for counterpart application NL2011358 issued on Jun. 18, 2014.
Hossfeld, H. et al: 'Particle Size Control in the Crystallization of Potassium Sulfate', Chemical Abstract, Chemical Abstracts Service, US, part 110, nr. 22, May 29, 1989, p. 170-171, XP000056818.

* cited by examiner

*Primary Examiner* — Timothy Vanoy
(74) *Attorney, Agent, or Firm* — Hoyng Monegier LLP; Minerva Rivero; David P. Owen (57) ABSTRACT

The invention relates to a potassium sulphate powder wherein about 80 wt % or more of the powder has a particle size of about 0.2 mm or lower, preferably about 0.13 mm or less. The particle size preferably is such, that about 80 wt % or more is about 0.02 mm or higher, more preferably about 0.04 mm or higher. This potassium sulphate powder dissolves easily in water, more in particular, 50 gram of said potassium sulphate powder dissolves in 1 liter of water without stirring within 1 minute, preferably within 30 sec. This potassium sulphate powder is very suitable as foliar fertilizer, in particular for broad acre crops. Further, the invention relates to the use of foliar potassium fertilizer, to enhance the uptake of potassium from the soil.

20 Claims, 5 Drawing Sheets

FERTILIZER FOR FOLIAR USE

CROSS REFERENCE TO RELATED APPLICATIONS

This application claims priority from U.S. provisional patent application No. 61/751,016 filed on 10 Jan. 2013, the contents of which are hereby incorporated by reference of their entirety.

BACKGROUND OF THE INVENTION

1. Field of the Invention

The invention relates generally to fertilizers for foliar use, and more particularly, to potassium sulphate fertilizers for foliar use.

2. Description of the Related Art

Fertilizers have long been in use. Generally the soil is provided with necessary components like nitrogen (urea, nitrate), phosphorous (phosphate), potassium (as a salt), sulphur (sulphate or sulphite), or by providing organic fertilizers. It has become clear that applying fertilizers on the leafs of plants may be advantageous, because components can be directly taken up by the plant. Such fertilizers are dissolved in water and applied by spraying.

BRIEF SUMMARY OF THE INVENTION

It is an object of the invention to provide an improved fertilizer for foliar application that is particularly suitable for application to broad acre crops.

It is a further object of the invention to have an improved use of fertilizer.

This object is achieved by providing a potassium sulphate powder wherein about 80 wt % or more of the powder has a particle size of about 0.2 mm or lower, preferably about 0.13 mm or less. The particle size preferably is such, that about 80 wt % or more is about 0.02 mm or higher, more preferably about 0.04 mm or higher. The powder preferably has a bulk density (loose) of about 1.44, and struck of about 1.10.

This object is furthermore achieved by a method comprising the application of a potassium sulphate powder, wherein about 80 wt % or more of the powder has a particle size of about 0.2 mm and lower, and wherein the powder is dissolved in water, to crops, and preferably to broad acre crops.

This object is furthermore achieved by a potassium sulphate powder wherein about 80 wt % or more of the powder has a particle size of about 0.2 mm or lower, and which powder dissolves easily in water, more in particular, such that 50 gram of said potassium sulphate powder dissolves in 1 liter of water without stirring within 1 minute, preferably within 30 sec.

This object is furthermore achieved by a method of improving the yield of crop, wherein potassium sulphate powder is dissolved in water, wherein about 80 wt % or more of the potassium sulphate powder has a particle size of 0.2 mm or lower, and wherein the powder is dissolved in water in equipment that has no need of mechanical stirring means, after which the solution is applied to said crop.

The further object is achieved by applying a potassium foliar fertilizer on a crop which has received soil applied potassium fertilizer or a crop which is grown in a soil containing high natural levels of potassium. Unexpectedly, the foliar applied potassium fertilizer causes a plant to increase the uptake of potassium from the soil in both of these cases.

Potassium sulphate fertilizer for foliar use is known, and it is used for e.g. tobacco, vegetables and fruit. The foliar application for broad acre crops like tuber or root crops such as potatoes or sugar beet; cereals like maize, rice, wheat, barley, grain and the like; or oil crops, like soy bean, sunflower, rape-seed or peanut; or other crops like clover, cotton or mustard, and the like is not common. This is mainly due to the difficulties in the mechanization of foliar application. But mechanization in other applications may cause problems as well.

The present potassium sulphate powder however shows a very high dissolution speed and is well wettable, and thereby is fully soluble without mechanical stirring. Furthermore, the preferred powder has more than 90 wt % of the powder of a size of 0.025 mm or higher. This is very advantageous to preclude dusting, and caking. Therefore, this potassium sulphate allows fully mechanical application in existing systems.

DESCRIPTION OF THE DRAWINGS

The features and advantages of the invention will be appreciated upon reference to the following drawing, in which:

FIG. 1 shows the dissolution of the potassium sulphate powder of the invention, in comparison to potassium nitrate as commercially available without stirring. Specifically.

Potassium nitrate is viewed as the best and fastest soluble grade of potassium available for foliar application. However, the comparison as depicted in the FIGS. 1A through 1D shows that—without stirring—the potassium sulphate according to the invention dissolves faster than potassium nitrate, and actually dissolves completely. The photographs were taken at the moment of adding the potassium sulphate or potassium nitrate to water, after 2 sec, 13 sec and 31 sec respectively. In contrast to potassium sulphate according to the invention, the potassium nitrate did not dissolve completely without stirring.

Figure 1A:
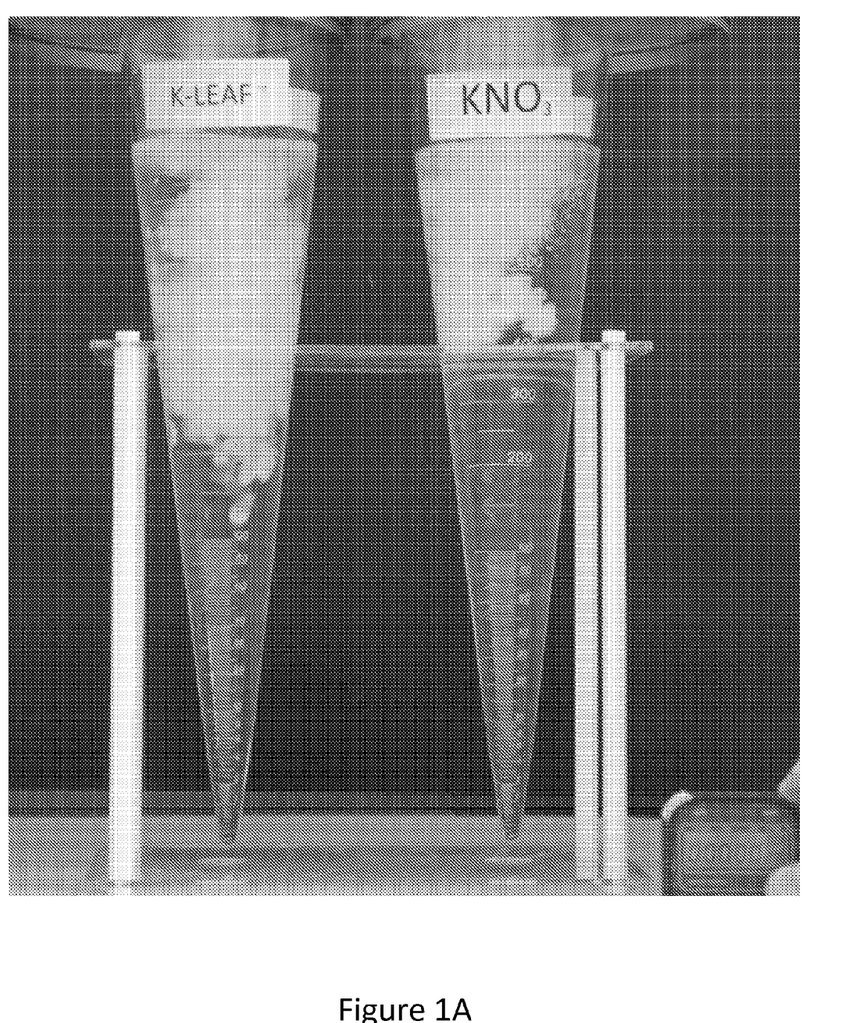
FIG. 1A shows the moment of adding the potassium sulphate or potassium nitrate to water.
Figure 1B:
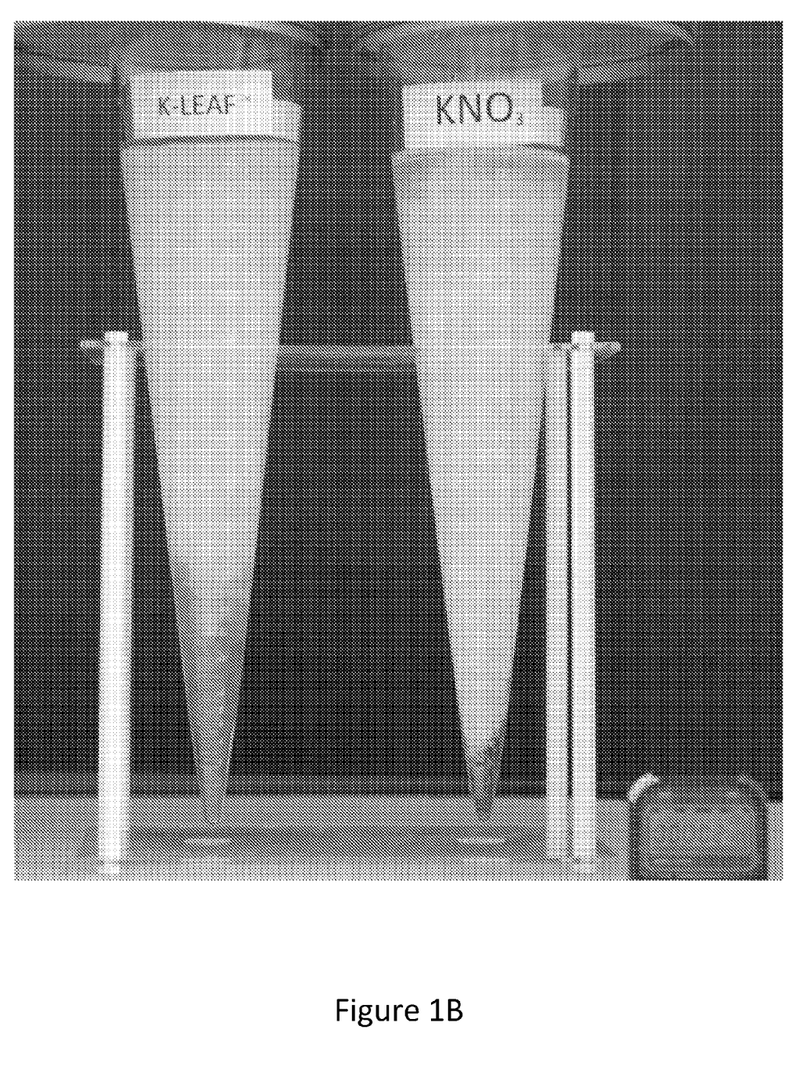
FIG. 1B shows elapse of 2 seconds.
Figure 1C:
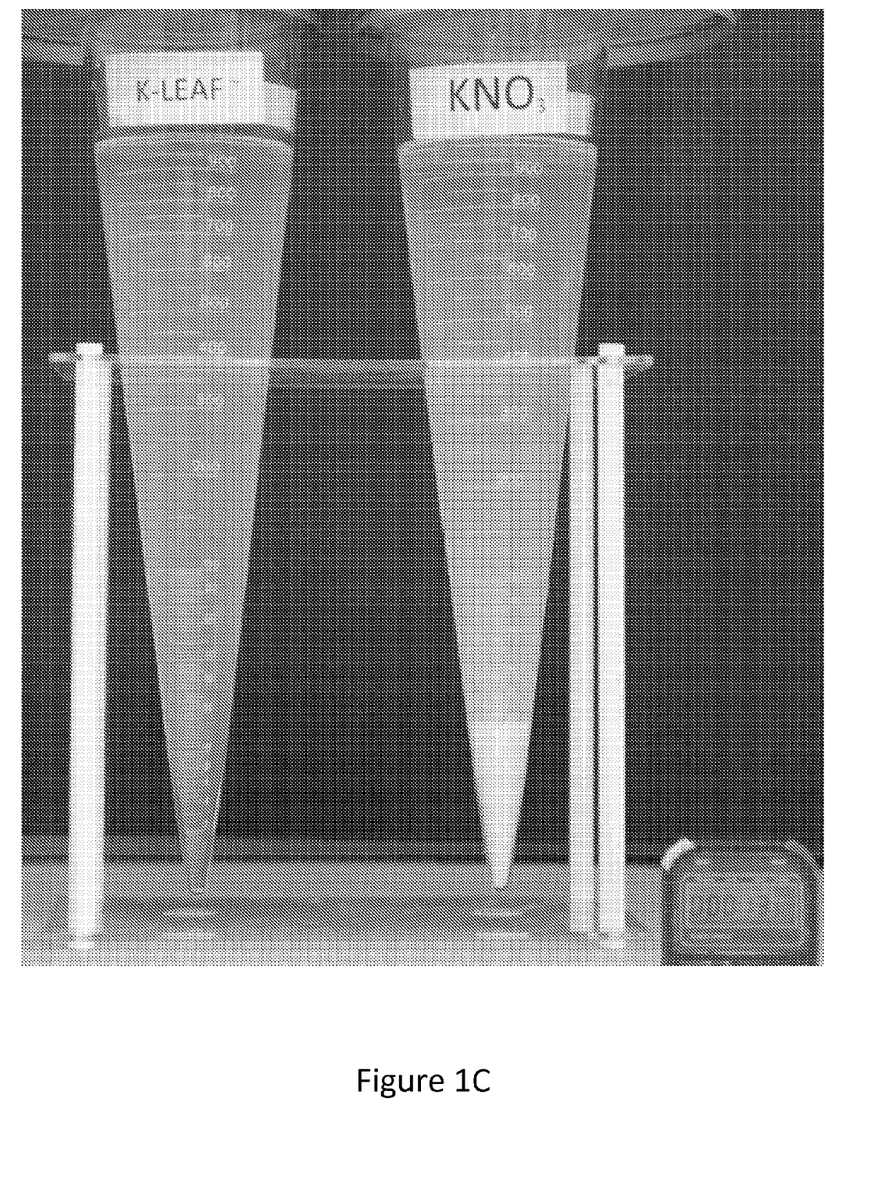
FIG. 1C shows elapse of 13 seconds and FIG. 1D shows elapse of 31 sec respectively.
Figure 1D:
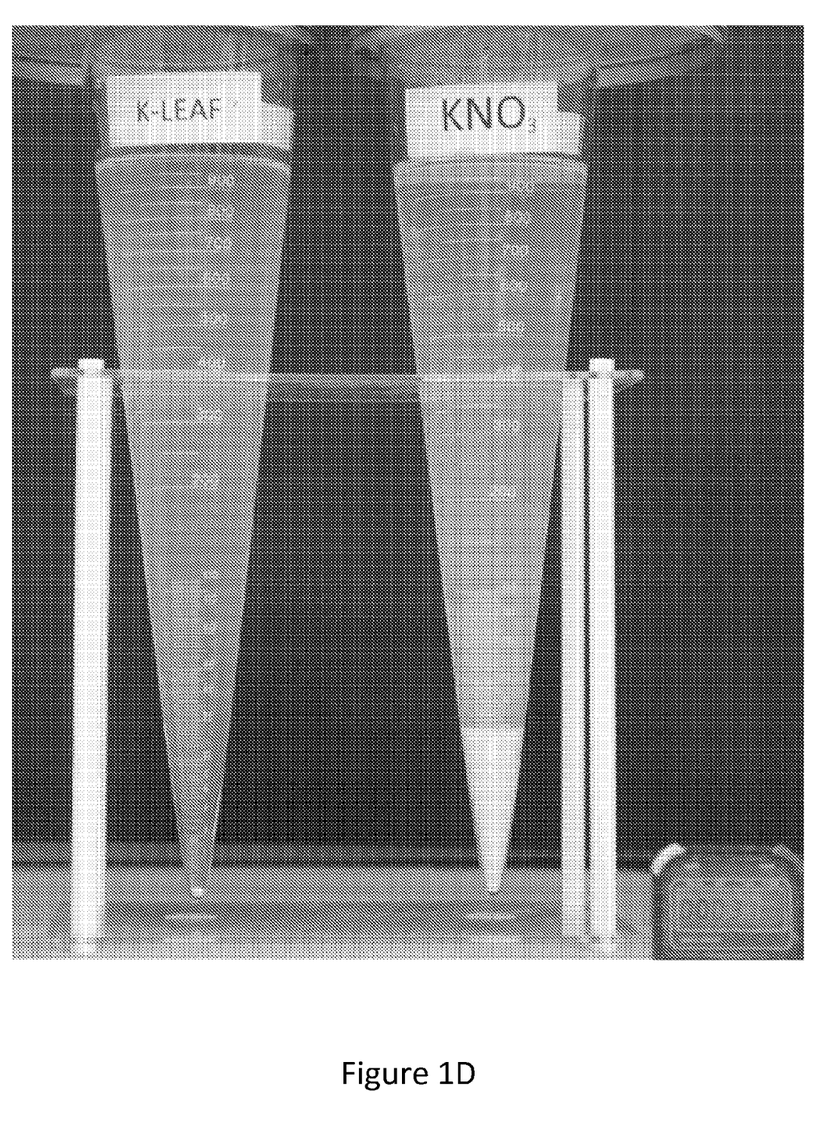
Figure 2:
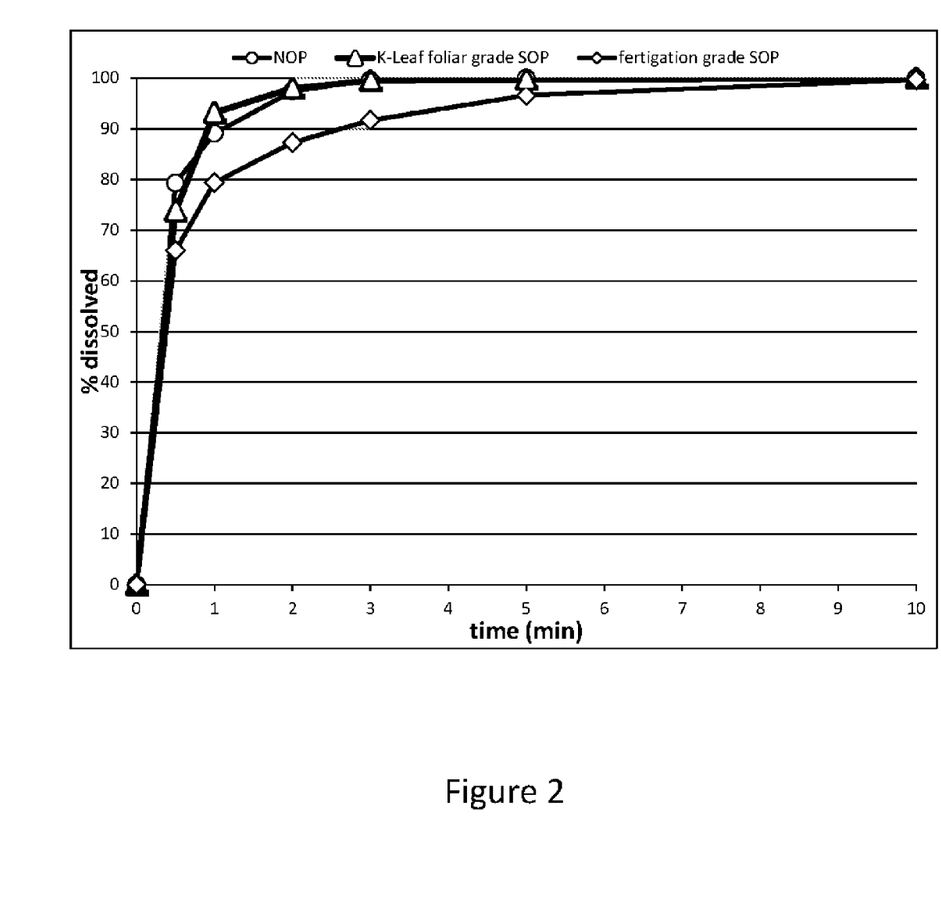
FIG. 2 shows a graph of the dissolution speed with stirring.

In another experiment, as shown in FIG. 2, applicant compared the dissolution rates of the now invented potassium sulphate powder with the commercially available potassium nitrate while stirring. It appeared that with stirring, both products dissolve equally fast.

A distinct advantage of the potassium fertilizer according the present invention is that the product dissolves, even without applying stirring. This is important because many of the large spray equipment for tractors used e.g. in broad acre crops do not comprise any stirring means, as these apparatus are developed for the application of liquid compounds, like (solutions of) pesticides and fungicides. Other applications like on vegetables or fruits like low-stem fruit trees, or grapes, may also use equipment without any stirring means. Also for these applications, mechanisation of the treatment may be optimized with the potassium fertilizer of the present invention. Potassium sulphate for foliar application is also available as solution. However, using such dissolved fertilizer has as distinct disadvantage, that a lot of the product is water, which needs to be transported, and paid for which negatively impacts the economics of the treatment.

DESCRIPTION OF ILLUSTRATIVE EMBODIMENTS

The following is a description of certain embodiments of the invention, given by way of example only and with reference to the examples.

The potassium sulphate of the present invention may have an average amount of potassium, calculated as $K_2O$, of about 48 wt % or more, preferably of about 50 wt % or more, and even more preferably about 51 wt % or more. Generally, the amount of potassium calculated as $K_2O$ will be about 55 wt % or less, preferably about 53 wt % or less.

The potassium sulphate of the present invention may have an amount of sulphur, calculated as $SO_4$, of about 54 wt % or more, preferably of about 55 wt % or more. Generally, the amount of sulphur calculated as $SO_4$ will be about 60 wt % or less, preferably about 58 wt % or less.

The amount of chloride in the potassium sulphate of the present invention generally may be about 3 wt % or less, preferably about 1 wt % or less, and more preferably about 0.5 wt % or less. Higher amounts of chloride can cause leaf-burn, which is to be precluded.

The potassium sulphate powder according the invention is a powder wherein about 80 wt % or more of the powder has a particle size of about 0.2 mm or less, preferably 0.13 mm or less. The potassium sulphate powder according to the invention is preferably a powder wherein about 90 wt % or more of the powder has a particle size of about 0.2 mm or less, preferably 0.13 mm or less. The potassium sulphate powder according to the invention is more preferred, a powder wherein about 95 wt % or more, even more preferred about 98% or more of the powder has a particle size of about 0.2 mm or less, preferably 0.13 mm or less.

The potassium sulphate powder according to the invention is preferably a powder wherein about 80 wt % or more of the powder has a particle size of about 0.02 mm or more, preferably about 0.04 mm or more. More preferably, the amount is about 90% or more, of a particle size of 0.02 mm or larger, preferably 0.04 mm or larger.

Preferably, about 10 wt % or less, more preferable about 5 wt % or less of the potassium sulphate is less than 0.045 mm.

Preferably, about 15 wt % or less, and more preferably about 10 wt % or less, and even more preferable about 5 wt % or less of the powder is large than 0.125 mm.

Preferably, about 0.5 wt % or less is about 0.3 mm or lower.

Preferably the potassium sulphate powder of the invention has a bulk density (loose) of about 1.44, and struck of about 1.10.

Preferably, the angle of repose is about 35 degrees.

The potassium sulphate powder according to the present invention preferably conforms with the above characteristics in combination, and a man skilled in the art will realise that selections from the higher and lower sizes can be combined, and that these can be combined with other characteristic as described in this patent application.

This potassium sulphate powder can be prepared by milling and sieving potassium sulphate. As raw material, potassium sulphate as known in the art for fertilizers can be used.

Preferably, the pH of the solution of a 1 wt % solution is about 5 or less, preferably about 4 or less, and most preferably about 3.5 or less. Generally, the pH will be about 2 or higher, preferably about 2.5 or higher. A slightly acidic solution is an advantage, because the dissolution speed is increased in comparison to a potassium sulphate that dissolves with a pH of about 5 or higher. Also, the slightly acidic solution precludes blocking in the equipment, and even has a cleaning effect in the equipment. The acidity can be achieved by having some acid component in the powder like potassium hydrogensulphate, citric acid, potassium dihydrogenphosphate and the like.

The speed of dissolution of the potassium sulphate of the present invention is better than the industry best, being potassium nitrate, in case the water is not stirred. With stirring the dissolution speed of the presently invented potassium sulphate is about the same as potassium nitrate. The speed of dissolution without mechanical stirring is a distinct advantage because most spray equipment used on tractors do not contain a stirring means, and it is important that all fertilizer is dissolved, both for reliable application, and to prevent clogging of the spray nozzles.

In a preferred embodiment of the invention, a spray solution is prepared by filling the main tanks of a spray apparatus for 50-80% with water, adding the potassium sulphate according the invention, and further adding water to fill the tank to about 100% of the required amount.

The foliar spray generally will be applied as about 0.4-11 wt % solution of potassium sulphate (which is about 4 to about 110 g/L), although other amounts are feasible. For example, preferred amounts include about 1%, 2%, 3%, 4%, 5% or 6% by weight, assuming an amount of water per hectare is 300 L/ha (i.e. about 32 gal/acre). In case lower amounts of water are to be applied, like for example 100 L/ha, or 200 L/ha, the concentrations may be higher, like for example up to 6%, 8% or 10%, or even 11%, although amounts lower than 8% are preferred. The solubility of potassium sulphate in water at 20 dgr C. is 129 gr/L. Hence, preferably, the amount used is about 120 g/L or less. It appears that the potassium sulphate according the invention dissolves quickly, even if concentrations are used close to the maximum solubility.

The potassium sulphate according the invention may be applied in an amount of about 0.8 kg or more per acre per application (i.e. about 2 kg or more per hectare per application).

In a preferred embodiment, the amount applied per acre is about 1.2 kg per acre, preferably 2 kg/acre, or more per application (i.e. about 3 resp. 5 kg or more per hectare per application).

The potassium sulphate according the invention may be applied in an amount of about 10 kg or less per acre per application (i.e. about 25 kg or less per hectare per application).

In a preferred embodiment, the amount applied per acre is about 8 kg per acre or less per application (i.e. about 20 kg or less per hectare per application)

Optimal amounts of the potassium sulphate according to the invention will depend on the specific crop, and include foliar application of about 5, about 8, about 10, about 12, about 15, about 18 or about 20 kg/ha/application.

The potassium sulphate will be dissolved in water in amounts suitable to achieve the amounts per acre described hereinbefore. The actual concentration will depend on the amount of liquid that will be applied by the farmer on its crops. Suitable amounts of water per acre on broad acre crops include between about 10 and about 40 gal/acre (about 40-160 L/acre, which is about 100 to 400 L/ha). To apply suitable amounts of potassium sulphate according the present invention, the concentration preferably is between about 1% by weight and about 10% by weight.

The source of water is not limited, and can be well-water, river water, rainwater, tap water or the like. The water to be used should preferably not have high calcium concentration, because calcium sulphate (gypsum) may precipitate. The allowable amount of calcium will depend on the concentration of potassium sulphate aimed for in the foliar spray.

The potassium sulphate according to the present invention may be applied once, twice, three times, four times or more often during the growth of the crop as foliar application. Generally, one, two or three applications will be adequate to clearly improve the yield per acre.

In a preferred embodiment, a potassium foliar fertilizer is applied to a crop for which the soil is well fertilized, or for which the soil is naturally rich in potassium.

In a preferred embodiment, the potassium fertilizer is applied according to the above described preferences, in combination with soil fertilization, wherein the soil is fertilized with at least 40 kg/ha potassium (as $K_2O$), preferably at least 100 kg/ha potassium (as $K_2O$).

The soil fertilizer may be powder, granular, water soluble or liquid fertilizer.

Preferably, the amount of potassium in the soil for a particular crop is close to the maximum desirable amount.

Hence, the invention also regards a method of combined application of fertilizers, wherein an amount of potassium fertilizer for the soil is applied, which amount is such that about 70% or more, preferably about 80% or more of the maximum advisable amount is applied, in combination with a foliar potassium fertilizer in amounts as described above. Most preferably, the foliar fertilizer of the invention, with high dissolution speed is used.

In a preferred embodiment, the application of the potassium sulphate according the present invention is combined with the application of a growth regulator or pesticide such as an insecticide or fungicide. The growth regulator or pesticide can be tested beforehand, to check compatibility with the potassium sulphate solution. In particular, such further compound should not comprise calcium.

In a preferred embodiment, the potassium sulphate is applied as foliar application at suitable periods during growth of the crop. Preferably, such suitable period is around the start of flowering, start of tuber forming root crop, during extensive growth periods, like after forming 4 leafs in maize, and the like.

Broad acre crops include tuber or root crops such as potatoes and sugar beet; cereal crops like maize, rice, wheat, barley, grain and the like; or oil crops, like soy bean, sunflower, rapeseed or peanut, or other crops like clover, mustard or cotton and the like.

Broad acre crops are to be distinguished from vegetables like onions or carrots, fruit trees like oranges, mandarins, olives or the like. The potassium sulphate according to the invention is also very suitable for application to these crops, but—depending on the equipment used—the currently available foliar fertilizers are quite well suitable for these applications. Yet, the advantageous properties of the now invented potassium sulphate will also be useful in application on such other crops, in particular if spray equipment is used that does not have a mechanical stirring means.

In one preferred embodiment of the invention, the potassium sulphate according to the invention is applied on potatoes or sugar beets.

In another preferred embodiment of the invention, the potassium sulphate according to the invention is applied on maize, wheat, rice or barley.

In another preferred embodiment of the invention, the potassium sulphate according to the invention is applied on soy bean, sunflower, rapeseed or peanut.

In another preferred embodiment of the invention, the potassium sulphate according to the invention is applied on clover, mustard or cotton.

In another embodiment, the potassium sulphate of the present invention is applied to vegetables, such as faba bean or tomatoes.

In another embodiment of the invention, the potassium sulphate according to the invention is applied to tobacco.

In another embodiment, the potassium sulphate of the present invention is applied to fruit crops such as avocado, banana, citrus, grape, pineapple, pome fruits or stone fruits, strawberry and the like.

In case the potassium sulphate is applied more than once, a further application is preferably between about 7 days up to about 20 days from the earlier application, but may also be up to about 30 days after application of the earlier application or even longer.

Further modifications in addition to those described above may be made to the structures and techniques described herein without departing from the spirit and scope of the invention. Accordingly, although specific embodiments have been described, these are examples only and are not limiting upon the scope of the invention.

EXAMPLES

Example 1

A spray unit for a tractor of about 1 metric ton volume was filled with about 600 L water from a rain water tank. A fungicide was added, and 40 kg potassium sulphate powder with the characteristic given in Table 1. After 1 min, virtually all of the potassium sulphate had dissolved. Over a further 3 min, another 300 L water was added, causing some turbulence in the spray unit tank. All potassium sulphate was dissolved by the time the tank was filled. Spraying of the solution was smooth through the nozzles; no blocking was observed. After finishing the application, the nozzles were checked, and appeared to be clean.

TABLE 1 characteristics of potassium sulphate powder used in the examples, for three lots

| Characteristic | Value | Value | Value |
|---|---|---|---|
| K2O (%) | 52 | " | " |
| SO4 (%) | 56 | " | " |
| Cl (%) | 0.3 | " | " |
| Sieve analysis; >0.125 mm (%) | 10 | 3 | 5 |
| Sieve analysis; >0.063 mm (%) | 65 | 60 | 62 |
| Sieve analysis; <0.063 mm (%) | 35 | 40 | 38 |
| Sieve analysis; <0.045 mm (%) | 5 | 8 | 10 |
| Bulk density loose | 1.44 | " | " |
| Bulk density tapped | 1.10 | " | " |
| Angle of repose | 35 | " | " |
| pH of a 1 wt % solution | 2.9 | " | " |

Example 2

Wheat

Two experiments with wheat were conducted. One site was in Mercedes, Corrientes, province (29° 12'S 58° 01'W). The other site was in Crespo, Entre Rios Province (32° 05'S 60° 25'W). The two sites were poor in available K in the soil. Agronomic features of the trials are shown in table 2.

The sites had a split plot design, where application of KCl at sowing was a first factor (0, and 40 kg $K_2O$/ha) and the spray rates was a second factor (0, 5, 7.5 and 10 kg of K-Leaf/ha). Foliar potassium sulphate was applied twice, at stem elongation (Zadock's 3) and at boot growth stages (Zadock's 4).

All sprays were performed under mild weather conditions regarding temperature, winds and relative humidity.

TABLE 2

Agronomic characteristics and management dates of the experiments

| Site | Variety/Density | Sowing | 1st Foliar Spray | 2nd Foliar Spray | Fertilizer Application kg/ha |
|---|---|---|---|---|---|
| Crespo, Entre Rios | Tauro/120 | July 15 | August 25 | September 30 | 55-42-0 |
| Exp. St. Mercedes, Corrientes | Chaja/160 | June 20 | September 5 | September 27 | 46-46-0 |

The treatment scheme and results (in kg/ha) are given in table 3.

TABLE 3

Treatment means and summary of results for wheat grain yields across sites

| Experiment | Foliar SOP* application at Zadock's 3-4 kg ha$^{-1}$ | K$_2$O application at planting kg ha$^{-1}$ | Crespo yield kg ha$^{-1}$ | Mercedes yield kg ha$^{-1}$ |
|---|---|---|---|---|
| A | 0 | 0 | 3,580 | 3,004 |
| 1 | 5 | 0 | 3,900 | 3,013 |
| 2 | 7.5 | 0 | 4,120 | 3,053 |
| 3 | 10 | 0 | 4,290 | 3,260 |
| B | 0 | 40 | 3,720 | 2,854 |
| 4 | 5 | 40 | 4,150 | 3,073 |
| 5 | 7.5 | 40 | 4,330 | 3,080 |
| 6 | 10 | 40 | 4,810 | 3,367 |

*SOP is sulphate of potash, is potassium sulphate

The results at the Crespo site were clearly better with foliar fertilizer than without. The site at Mercedes was less clear with respect to the results. In any case, application was smooth, and the dissolution speed superb.

Example 3

Maize

Maize was treated, grown in France, in Onesse et Laharie; the variety was ES Zoom, and was sown on 3 May at a density of 85.000 g/ha. The initial fertilization was 300 kg/ha 11-23-23, and 600 L/ha solution was applied (N-P-K: 267-69-69). The lots were well irrigated. The results are in the last column (at 15% moisture)

TABLE 4

| Number | 2-3 leaves | 4-6 leaves | 7-8 leaves | Results (ton/ha) |
|---|---|---|---|---|
| 1 | No treatment | | | 15.2 |
| 2 | 6 kg/ha | | | 15.4 |
| 3 | 12 kg/ha | | | 15.8 |
| 4 | | 6 kg/ha | | 15.7 |
| 5 | | 12 kg/ha | | 15.9 |
| 6 | | | 6 kg/ha | 15.3 |
| 7 | | | 12 kg/ha | 15.4 |

The treatments of foliar potassium sulphate were applied with an arm for spraying of 2,4 m long. The amount prepared for spraying was for 150 L/ha. No problems at all were noticed with respect to blocking of the spray nozzles (TeeJet XR110, pipe with pin). The solubility was fast and complete, and did not cause any problems, even at 10% (100 g/L).

The results show an increase in yield although not very large, because the soil was well fertilized. In a next experiment, the treatment will be pursued at 2-3 leaves with 6 kg/ha potassium sulphate, and a growth regulator; and at 4-6 leaves with an insecticide. The treatment with the additional compounds are standard treatments at these given times, and the addition of potassium sulphate does hardy add any labor costs.

Example 4

Bean

The trial was set up to evaluate potassium sulphate in a bean crop. The trial was located in the North of France in Caix (80170) on Angara variety. The type of soil was loamy clay. The bean drilling was realized on 18 Jul. 2012 in second crop (after peas). The drilling depth was 2 cm.

The first application of potassium sulphate was performed shortly before flowering. The second application was done 29 days later (end of flowering of the crop). The spray volume was 300 L/ha. The harvest was done on 6 weeks later in good conditions.

No necrosis, chlorosis, stunting or thinning symptoms were observed on the crop during any of the assessment dates. Hence, the potassium sulphate product was perfectly crop safe. Also, no effect of potassium sulphate was observed on the vigour of the crop, whatever the used rate and the number of applications.

In untreated plots, the yield was very good: 17.9 T/ha. The use of the potassium sulphate applications allowed an increase in yield from 1.4 T/ha to 2.6 T/ha. The early application (before flowering) presented better improvement than the late application (after flowering).

Example 5

Soybean

The sites were in Peyrano, Santa Fe province (33° 34'S 60° 49'W) and in Ocampo, Buenos Aires Province (33° 48'S 60° 42'W). The experiment comprised four (4) treatments as rates of foliar sprays of potassium sulphate (0-0-50-18S): 0, 5, 7.5 and 10 kg/ha, applied at beginning of flowering (R3) and at beginning of pod set (R5) growth stages. The period between the two applications was about 20 days. The treatments were accommodated in a randomized block design with five replications. No problems were observed with the dissolution of the potassium sulphate, despite the mechanized treatment.

Results are summarized in Table 5; the yield is given in kg per hectare of soybean grain.

TABLE 5

| Treatment | Results at Ocampo | Result at Peyrano |
|---|---|---|
| None | 3,550 | 3,523 |
| 5 kg/ha | 3,716 | 3,933 |
| 7.5 kg/ha | 3,629 | 4,142 |
| 10 kg/ha | 3,812 | 3,895 |

Example 6

Wheat

A set of experiments were carried out at three different locations in Sinai Peninsula, Egypt in order to evaluate the effect of potassium rates and method of application on growth and yield parameters and minerals content of wheat (*Triticum aestivum*, L) Cultivar Sakha-93. The experimental locations were:—

1—Wadi suder, South Sinai Peninsula, which irrigated water from wells.
2—El-Taqadom area, Middle of Sinai peninsula, which irrigated with fresh Nile water from Sarbum canal.
3—Galbana village, El-Tina Plain, South of Sinai peninsula, which irrigated from El-salam canal which is mixed water from Nile and agriculture drainage.

Eight fertilizer treatments were tested in this study. The treatments were:
1—Control (0.0 K application).
2—1% K2SO4 foliar sprays.
3—50 kg/K2O/feddan soil application.
4—50 kg/K2O/fed soil application.+1% K2SO4 foliar sprays.
5—75 kg/K2O/fed. soil application
6—75 kg/K2O/fed. soil application+1% K2SO4 foliar spray
7—100 kg/k2O/fed. soil application
8—100 kg/K2O/fed. soil application+1% K2SO4 foliar spray.

Potassium sulphate foliar sprays repeated three times at tillering, at jointing and at flowering. Nitrogen and phosphorous were applied to soil as farmers do. Except El-Taqadom site, nitrogen was applied at the rate of 100 kg nitrogen per feddan in the form of ammonium nitrate in equal three doses as farmers do. Phosphorous was applied at the rate of 30 kg P2O5 per feddan in the form of superphosphate 15% during soil preparation before sowing. The experiments were laid out on randomized complete block design with five replications. The area of each replicate is 5*6m=30 m2. Wheat was sowed using a seed rate of 60 kg per feddan and planted within the last week of November. All the recommended agronomic practices for wheat plant were done as followed by the growers of each region during the growing season. At harvest stage the agro-morphological traits were determined as plant height (cm), spike length (cm), number of spikelet's/spike, weight of 1000 seed (gm), number of spikes/m2, biological yield (ton/fed) grain and straw yield ton/fed) and the data were recorded in tables (6-8).

Table (6) shows the effect potassium fertilization on wheat yield parameters grown in Wadi Suder, Excremental Station DRC South of Sinai peninsula.

TABLE 6

| | Yield parameter | | | | | | | |
|---|---|---|---|---|---|---|---|---|
| Treatment number | Plant height/cm | No. of Spikes/m2 | No. of grains/spike | 1000 grain weight(g) | Grain protein content % | Straw yield t/fed | Grain yield t/fed. | Harvest index % |
| 1 | 75.1 | 216 | 30 | 38.5 | 11.56 | 2.56 | 1.68 | 0.396 |
| 2 | 78.3 | 220 | 35 | 40.1 | 11.81 | 2.85 | 1.88 | 0.397 |
| 3 | 78.5 | 222 | 35 | 41.3 | 12.44 | 2.99 | 1.95 | 0.396 |
| 4 | 80.6 | 232 | 40 | 44.3 | 12.63 | 3.06 | 2.03 | 0.399 |
| 5 | 84.3 | 256 | 42 | 46.5 | 13.13 | 3.39 | 2.25 | 0.399 |
| 6 | 90.5 | 270 | 42 | 47.9 | 13.38 | 3.66 | 2.40 | 0.396 |
| 7 | 91.0 | 272 | 42 | 50.0 | 14.06 | 3.67 | 2.41 | 0.396 |
| 8 | 91.5 | 274 | 43 | 50.2 | 14.06 | 3.68 | 2..41 | 0.396 |

Table (7) shows the effect of the use of potassium fertilization on wheat yield parameters grown in El-Taqadom region

TABLE 7

| | Yield parameter | | | | | | | |
|---|---|---|---|---|---|---|---|---|
| Treatment number | Plant height/cm | No. of Spikes/m2 | No. of grains/spike | 1000 grain weight(g) | Grain protein content % | Straw yield t/fed | Grain yield t/fed. | Harvest index % |
| 1 | 85.6 | 225 | 39 | 43.5 | 10.81 | 3.47 | 2.31 | 0.996 |
| 2 | 86.3 | 228 | 40 | 45.1 | 11.13 | 3.93 | 2.60 | 0.398 |
| 3 | 87.5 | 229 | 40 | 46.3 | 11.37 | 4.12 | 2.68 | 0.394 |
| 4 | 90.1 | 252 | 44 | 48.7 | 12.19 | 4.28 | 2.85 | 0.400 |
| 5 | 94.3 | 276 | 45 | 50.1 | 13.75 | 4.55 | 3.00 | 0.397 |
| 6 | 96.5 | 290 | 45 | 51.6 | 13.75 | 4.68 | 3.11 | 0.399 |
| 7 | 96.7 | 292 | 44 | 51.1 | 14.38 | 4.61 | 3.00 | 0.394 |
| 8 | 96.0 | 294 | 44 | 52.2 | 14.38 | 4.60 | 2.95 | 0.391 |

Table (8) Effect potassium fertilization on wheat yield parameters grown in El-Tina Plain, North of Sinai Peninsula.

TABLE 8

| | Yield parameter | | | | | | | |
|---|---|---|---|---|---|---|---|---|
| Treatment number | Plant height/cm | No. of Spikes/m2 | No. of grains/spike | 1000 grain weight(g) | Grain protein content % | Straw yield t/fed | Grain yield t/fed. | Harvest index % |
| 1 | 80.2 | 232 | 42 | 42.3 | 11.20 | 3.43 | 2.10 | 0.3797 |
| 2 | 81.3 | 236 | 45 | 43.4 | 11.20 | 3.63 | 2.36 | 0.3940 |
| 3 | 82.6 | 236 | 45 | 43.9 | 11.56 | 3.82 | 2.39 | 0.3849 |

TABLE 8-continued

| | Yield parameter | | | | | | |
|---|---|---|---|---|---|---|---|
| Treatment number | Plant height/cm | No. of Spikes/m2 | No. of grains/spike | 1000 grain weight(g) | Grain protein content % | Straw yield t/fed | Grain yield t/fed. | Harvest index % |
| 4 | 86.1 | 259 | 49 | 45.3 | 12.06 | 4.08 | 2.55 | 0.3846 |
| 5 | 88.8 | 283 | 53 | 48.5 | 13.13 | 4.42 | 2.76 | 0.3844 |
| 6 | 91.7 | 297 | 53 | 50.4 | 13.75 | 4.62 | 2.88 | 0.3840 |
| 7 | 91.7 | 299 | 54 | 51.1 | 13.75 | 4.37 | 2.75 | 0.3862 |
| 8 | 91.7 | 299 | 56 | 51.9 | 14.13 | 4.49 | 2.80 | 0.3841 |

Example 8

Potatoes

To potato crop, foliar potassium sulphate according the invention was applied in several application schemes. Three or four times, the foliar fertilizer of the invention was applied. Both the yield, and the quality of the potatoes was increased by the foliar fertilizer.

The application scheme and the results are given in the following table 9; days are in days after flowering:

TABLE 9

| Experiment | Flowering | +10 days | +20 days | +30 days | Yield in Ton/Ha |
|---|---|---|---|---|---|
| Control | — | — | — | — | 53.0 |
| Exp 1 | 2% | 2% | 2% | — | 56.3 |
| Exp 2 | 4% | 4% | 4% | — | 62.2 |
| Exp 3 | 2% | 2% | 2% | 2% | 67.0 |
| Exp 4 | 4% | 4% | 4% | 4% | 73.6 |

Example 9

Rapeseed in Poland

Foliar potassium sulphate was applied in several schemes to rapeseed. The application was either at the rosette stage, or the bud stage, or both, in varying amounts. The soil was fertilized with sufficient potassium. Furthermore, it was calculated how much of the additional growth was based on the potassium supplied. It appeared that the growth was substantially more in most cases, than possible based on the foliar spray alone. Hence, in those cases, the foliar spray caused additional potassium uptake from the soil. The results are depicted in Table 10.

TABLE 10

| Application | Productivity in MT/ha | Difference in used $K_2O$/ha | Amount of potassium from foliar spray | Amount of potassium from soil |
|---|---|---|---|---|
| Control | 4.59 | — | | |
| 2% at rosette stage | 5.18 | 8.81 | 5 | 3.81 |
| 4% at rosette stage | 5.30 | 10.68 | 10 | 0.68 |
| 2% at bud stage | 5.21 | 9.24 | 5 | 4.24 |
| 4% at bud stage | 5.57 | 14.67 | 10 | 4.67 |
| 2% at both stages | 5.58 | 14.79 | 10 | 4.79 |
| 4% at both stages | 5.96 | 20.64 | 20 | 0.64 |

The above described effect was particularly unexpected. This allows with a relatively low dose foliar spray, to synergistically enhance the uptake of potassium from the soil.

Example 10

Sugar Beet in Morocco

Soil was fertilized with 186 kg Nitrogen per hectare, 138 kg $P_2O_5$ per hectare, and 140 kg $K_2O$ per hectare. This was treated as control. Furthermore, one to three applications of foliar spray was utilized at 10.4 kg per hectare for all crop, and depending on the trial, one or two additional sprays of 7.8 kg/ha. The sprays were at 120 days after planting, 142 days and 171 days. The results are given in table 11.

TABLE 11

| Application | Productiviy in MT per ha | Productivity of sugar per ha | Difference in productivity as K from foliar | Difference in productivity as K from soil |
|---|---|---|---|---|
| Control | 81.5 | 14.8 | — | — |
| One spray | 89.9 | 16.8 | 10.4 | 31.6 |
| Two sprays | 88.4 | 15.9 | 18.2 | 16.3 |
| Three sprays | 96.4 | 18.4 | 26.0 | 48.5 |

CONCLUSION

The examples are illustrative only, but the tests show that the foliar application of potassium sulphate according to the invention is without any problems even in fully mechanized systems, without mechanical stirring. Further, the examples show that applying foliar potassium fertilizer enhances the plant's ability to use potassium from the soil, and thereby enhancing the efficacy of the foliar spray.

What is claimed is:

1. Potassium sulphate powder wherein about 80 wt % or more of the powder has a particle size of about 0.2 mm or lower, and wherein about 80 wt % or more of the potassium sulphate powder has a particle size of about 0.02 mm or higher.

2. The potassium sulphate powder according to claim 1, wherein about 95 wt % or more of the powder has a particle size of about 0.2 mm or lower, and wherein about 95 wt % or more of the potassium sulphate powder has a particle size of about 0.02 mm or higher.

3. The potassium sulphate powder according to claim 1, wherein a 1 wt % solution of the potassium sulphate powder has a pH of about 4 or lower.

4. The potassium sulphate powder according to claim 1, wherein the potassium sulphate powder dissolves easily in water, such that 50 gram of said potassium sulphate powder dissolves in 1 liter of water without stirring within about 1 minute or less.

5. A method of improving the yield of crop, wherein potassium sulphate powder dissolved in water is applied to said crop as a foliar application, wherein said potassium sulphate powder is a potassium sulphate powder wherein about 80 wt % or more of the powder has a particle size of about 0.2 mm or lower.

6. The method of improving the yield of a crop according to claim 5, wherein said crop is a broad acre crop.

7. The method of claim 6, wherein said broad acre crop is chosen from the group of root or tuber crops.

8. The method of claim 6, wherein said broad acre crop is a cereal, chosen from the group consisting of maize, wheat, rice, grain and barley.

9. The method of claim 6, wherein said broad crop is an oil crop chosen from soy bean, sunflower, rapeseed, or peanut.

10. The method according to claim 6, wherein said broad acre crop is clover, cotton or mustard.

11. The method according to claim 5, wherein the potassium sulphate is applied in an amount of about 1.2 kg or more per acre per application (i.e. about 3 kg or more per hectare per application), and in an amount of about 10 kg or less per acre per application (i.e. about 25 kg or less per hectare per application).

12. The method according to claim 5, wherein the potassium sulphate is applied once, twice, or three times or more often during the growth of the crop.

13. The method according to claim 12, wherein in case the potassium sulphate is applied more than once, a further application is applied between about 7 days up to about 20 days from the earlier application.

14. The method according to claim 5, wherein potassium sulphate powder is dissolved in water in equipment that has no need of mechanical stirring means, after which the solution is applied to said crop, wherein said potassium sulphate powder is a potassium sulphate powder wherein about 80 wt % or more of the powder has a particle size of about 0.2 mm or lower.

15. The method according to claim 14, wherein said solution is prepared by filling the main tanks of a spray apparatus for 50-80% with water, adding the potassium sulphate and further adding water to fill the tank to about 100% of the required amount.

16. A method of improving the yield of crop, wherein a potassium foliar fertilizer is applied on a crop for which the soil has high nutrient level of potassium, such that the foliar applied potassium fertilizer causes a plant to increase the uptake of potassium from the soil.

17. The method according to claim 16, wherein potassium fertilization is used both on soil and as foliar application, to achieve an additional uptake from the soil by the foliar application.

18. The method according to claim 17, wherein a combined application of fertilizers is used, wherein an amount of potassium fertilizer for the soil is applied, which amount is such that about 70% or more of the maximum desirable amount is applied, in combination with a foliar potassium fertilizer in an amount of about 1.2 kg or more per acre per application (i.e. about 3 kg or more per hectare per application), and in an amount of about 10 kg or less per acre per application (i.e. about 25 kg or less per hectare per application).

19. The method according to claim 16, wherein potassium sulphate powder, wherein about 80 wt % or more of the powder has a particle size of about 0.2 mm or lower, and wherein about 80 wt % or more of the potassium sulphate powder has a particle size of about 0.02 mm or higher, is used.

20. The method according to claim 17, wherein the potassium foliar fertilizer is applied, wherein the potassium sulphate is applied in an amount of about 1.2 kg or more per acre per application (i.e. about 3 kg or more per hectare per application), and in an amount of about 10 kg or less per acre per application (i.e. about 25 kg or less per hectare per application), in combination with soil fertilization, wherein the soil is fertilized with at least 40 kg/ha potassium (as $K_2O$).

* * * * *